(12) United States Patent
Dion et al.

(10) Patent No.: US 6,419,367 B1
(45) Date of Patent: Jul. 16, 2002

(54) GLARE SHIELD ATTACHMENT FOR A LIQUID CRYSTAL DISPLAY SCREEN

(76) Inventors: Timothy J. Dion; Karen A. Dion, both of 28128 Pacific Coast Hwy., Space 159, Malibu, CA (US) 90265

( * ) Notice: Subject to any disclaimer, the term of this patent is extended or adjusted under 35 U.S.C. 154(b) by 0 days.

(21) Appl. No.: 09/757,543

(22) Filed: Jan. 11, 2001

(51) Int. Cl.[7] .......................... G02B 21/00; G02B 27/00
(52) U.S. Cl. ...................... 359/612; 359/601; 359/609; 348/834; 348/842
(58) Field of Search .................. 359/601–613, 359/819, 811, 408, 817; 348/834–842; 345/905; 361/681, 686; 358/906, 909.1; 386/117–118

(56) References Cited

U.S. PATENT DOCUMENTS

| | | | | |
|---|---|---|---|---|
| 4,865,420 A | * | 9/1989 | Schmidt | 359/601 |
| 5,069,529 A | * | 12/1991 | Takahashi | 359/601 |
| 5,243,463 A | * | 9/1993 | Waintroob | 359/601 |
| 5,710,860 A | * | 1/1998 | Kim | 386/118 |
| 5,905,546 A | * | 5/1999 | Giulie et al. | 348/842 |
| 5,988,823 A | * | 11/1999 | Wong | 359/601 |
| 6,144,419 A | | 11/2000 | Schmidt | 348/842 |

* cited by examiner

*Primary Examiner*—Thong Nguyen
(74) *Attorney, Agent, or Firm*—Jack C Munro

(57) ABSTRACT

A tubular attachment for a video monitor frame which encloses an LCD screen by insertion of the frame through an entry opening in the attachment to be located within an internal chamber of the attachment. The function of the attachment is to reduce glare when observing an LCD screen and also to provide an element of privacy and decrease sun damage to the LCD screen. The attachment is to be constructed of a rubberized fabric sheet material which not only permits the attachment to be stretched to accommodate to different sizes of video monitor frames but also permits the attachment to be collapsed when not in use facilitating its stowage.

8 Claims, 1 Drawing Sheet

GLARE SHIELD ATTACHMENT FOR A LIQUID CRYSTAL DISPLAY SCREEN

BACKGROUND OF THE INVENTION

1. Field of the Invention

The subject matter of this invention relates to an attachment for a liquid crystal display (LCD) screen housed in portable electronic devices such as a video monitor and in particular an attachment that is easily connected and disconnected to the screen or frame with the attachment being readily collapsible to assume a compact position for stowage when not in use.

2. Description of the Related Art

When using an LCD screen in a video monitor of electronic devices in an outdoor environment, and possibly within certain indoor environments, ambient light can cause the creation of glare on the screen. This glare makes it very difficult to observe the screen. It is not only desirable, but generally necessary, to preclude as much of the ambient light as possible from being subjected to the LCD screen so that g of the image on the screen is easily accomplished by t image being clearly shown.

Previously, there have been constructed hoods for video monitors which are designed to be mounted in conjunction with the video monitor. Typically, these hoods are constructed of a plurality of planar panels with these panels to be mounted in some manner on the video monitor frame surrounding and enclosing the video monitor screen. However, these prior art devices constructed of the plurality of panels, though collapsible, are not easily portable. Portability is a big factor especially in conjunction with video camcorders and other portable personal electronic devices (e.g. DVD players, laptop computers, etc.). Also, the prior art hoods do not readily accommodate to video monitor screens or LCD screens of different sizes as not all video monitor frames or LCD screens are of the same size. There is a need for a device that is durable, lightweight, portable and easily attachable to an LCD or video monitor frame and is capable of accommodating to slight variance in sizes of the actual display screen or video monitor frame.

SUMMARY OF THE INVENTION

An attachment for an LCD screen frame which is basically of tubular construction having an encompassing sidewall on which is mounted a back wall. Opposite the back wall is front which is entirely open forming an access opening. The body of the attachment is constructed of a rubberized fabric material. The body, in an at-rest position, assumes its tubular configuration with the access opening being of maximum size. An LCD screen frame is to be inserted through an entry opening formed within the sidewall with the attachment assuming a snug configuration with the LCD screen frame with the only light that is permitted to enter the internal chamber of the body is through the access opening. When the video monitor frame is extracted from the entry opening, the body is collapsible to occupy a small amount of space facilitating its stowage within small confinements, such as a pocket. The sidewall may also include a button access opening to provide access to activating buttons formed on the LCD screen frame. The body of the attachment resembles a square or rectangular box.

One of the objectives of the present invention is to provide an attachment for an LCD screen frame that is to reduce glare while observing the LCD screen that is contained within the LCD screen frame.

Another objective of the present invention is to construct an attachment for an LCD screen frame which when placed on the frame provides an element of privacy for tie authorized observer(s) of the screen making it difficult for unauthorized individuals to observe the screen.

Another objective of the present invention is to construct an attachment for an LCD screen frame that decreases the possibility of sun damage to the screen.

BRIEF DESCRIPTION OF THE DRAWING

For a better understanding of the present invention, reference is to be made to the accompanying drawings. It is to be understood that the present invention is not limited to the precise arrangement shown in the drawings.

DETAILED DESCRIPTION OF THE INVENTION

Figure 1:
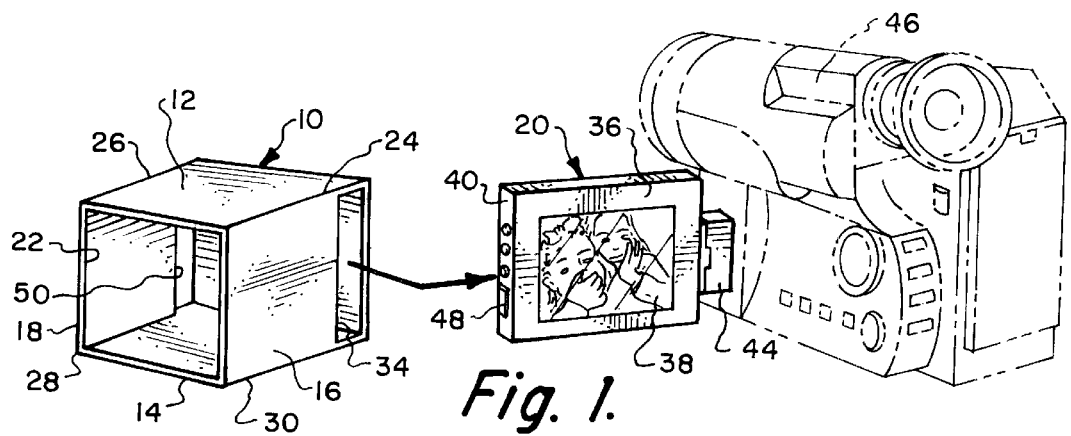
FIG. 1 is an isometric view of the attachment of the present invention shown in conjunction with a typical video camcorder which has mounted thereon a video monitor frame which includes an LCD screen with the attachment shown separate from the video camcorder.
Figure 2:
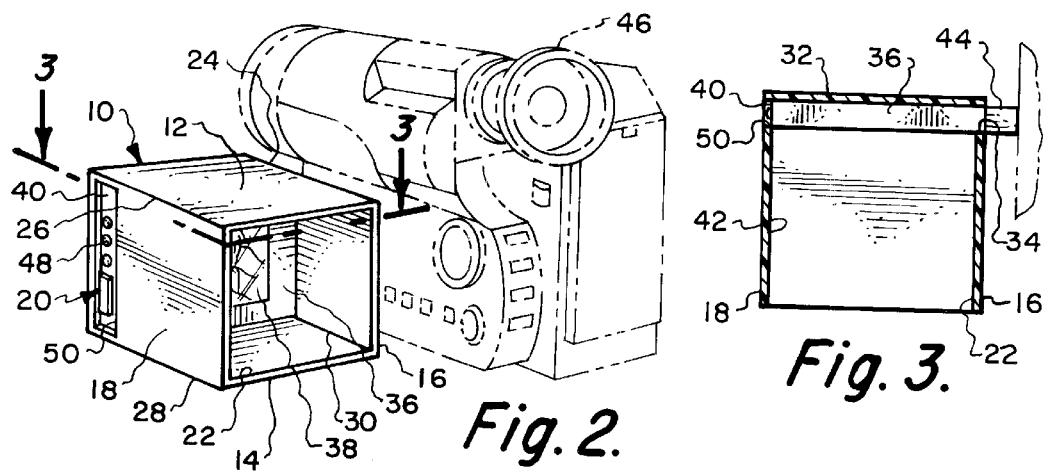
FIG. 2 is an isometric view of the attachment of the present invention showing such mounted in conjunction with the video camcorder.
Figure 3:
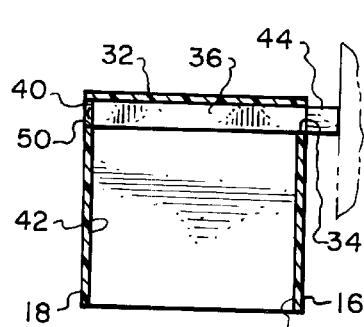
FIG. 3 is a cross-sectional view through the attachment taken along line 3—3 of FIG. 2.

The primary goal of the present invention is to increase visual clarity in brightly lit conditions of an LCD screen housed in portable electronic devices. Although it is Possible that glare could be produced within indoor conditions it is most likely to occur when using an LCD screen in an outdoor environment wherein the screen is subjected to bright sunlight. The attachment of this invention could be used on a vide camcorders, digital cameras, digital picture frames, portable digital video disc players, video playback devices, fish finders, navigational devices such as global positioning satellite de ices, laptop computers, portable televisions, personal computer organizers, calculators and computer monitors.

Most of the above mentioned devices, at the present time, include a video monitor. The video monitor constitutes a video monitor screen comprised of an LCD screen which is enclosed within a frame. This frame is mounted on the electronic device and may be pivotable from a retracted position to an extended position. When in the extended position, the screen is capable of being observed.

Referring particularly to the drawing, there is shown the attachment 10 of this invention which is basically in a box-like configuration. Although the attachment 10 ifs shown to be box-like, it is understood that the attachment 1 need not be constructed to be in a box-like configuration but could be round, ellipsoidal or any other tubular configuration. The attachment 10 has a sidewall which comprises a top 12, and a bottom 14 which is located parallel to the top 12. The sidewall also includes a right side 16 and a left side 18 which are also parallel. The bottom 14 is of the same size as the top 12. The right side 16 is also the same as the left side 18. The top 12, bottom 14, right side 16 and left side 18 are all constructed of the same sheet material with the preferable material being a rubberized fabric material. Neoprene would be a preferable type of material. Also, a nylon plus neoprene material would be satisfactory. Also, a nylon rubberized waterproof fabric would be satisfactory. The rubberized material of construction for the attachment 10 is desired as it provides a certain amount of stretchability thereby facilitating attachment to slightly different sizes of video monitors 20, and also when the attachment 10 is mounted in conjunction with the video monitor frame 36 that it assumes a snug fit therebetween. Typically, the attachment 10 will have a length in the range of two to three inches with the access opening 22 of the attachment 10 being in the range of three to four inches square or rectangular. Typically, the thickness of the top wall 12, bottom wall 14, right sidewall 16 and left sidewall 18 will be one-eighth to one-quarter of an inch.

Connecting the top wall 12 to the right sidewall 16 is a seam 24. A seam 26 connects between the top wall 12 and the left side wall 18. Between the left side wall 18 and the bottom wall 14 is a seam 28. Also, there is a seam 30 located between the bottom wall 14 and the right sidewall 16. Each of the seams 24, 26, 28 and 30 could be achieved by stitching, adhesive or heat fusion. Also, it is considered to be within the scope of this invention that the seams could be constructed in any desirable manner as the attachment 10 could be a molded product.

Connected also by seams to the top wall 12, right side wall 16, bottom wall 14 and left side wall 18 is a back wall 32. The back wall 32 is of the same material of construction as the top wall 12, right sidewall 16, left sidewall 18 and bottom wall 14. The size of the back wall 32 is essentially identical to the access opening 22 and is located opposite the access opening 22. Formed within the right sidewall 16 is an entry opening 34. The entry opening 34 is shown to be rectangular in configuration. However, the shape of the entry opening is deemed to be selectable to any desired shape.

The video monitor frame 36, which encloses an LCD screen 38, is to be insertable through the entry opening 34. Generally, it would be preferred that the entry opening 34 be just slightly smaller in size than the cross-sectional configuration of the video monitor frame 36. This is so as to cause the attachment 10 to be expanded slightly to stretch during the insertion of the video monitor 20 within the entry opening 34. The video monitor 20 is to be inserted within the entry opening 34 until the outer edge 40 is inserted entirely within the internal chamber 42 of the attachment 10. It is to be noted that the entry opening 34 is located directly adjacent the back wall 32 which provides the greatest distance from the access opening 22 and the screen 38 which decreases the amount of ambient light that is subjected to the screen 38. Also, the neoprene material, or o ther suitable material, is dark in color on its inside surface and does not reflect light from the walls of the interior chamber 42 to the screen 38.

With the attachment 10 in conjunction with the video monitor 20, a tunnel is, in essence, provided which blocks out ambient light with the exception of a small amount of ambient light that can pass through the access opening 22. The result is that glare against the video monitor screen 38 is substantially reduced.

The video monitor 20 is mounted by a hinge 44 to a video camcorder 46. The video monitor 44 can be moved by the hinge from the extended position shown in the drawing to a retracted position with the video monitor screen 38 located in abutting contact with the video camcorder 46 and with the screen 38 not being observable. The video monitor screen 38 is to display the images that are being recorded by the video camcorder 46 on to play back recorded images.

Figure 4:
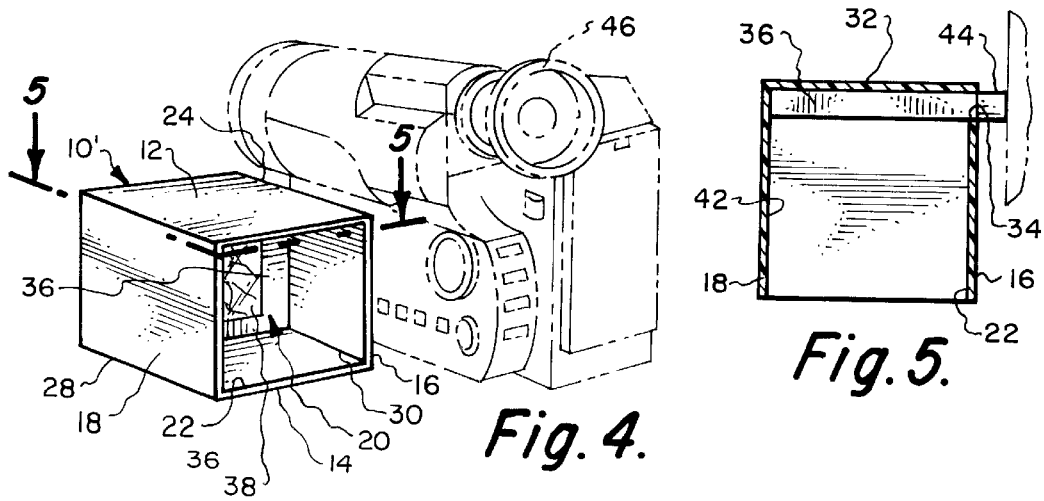
FIG. 4 is an isometric view of a modified form of attachment depicted being mounted in conjunction pith a video camcorder.
Figure 5:
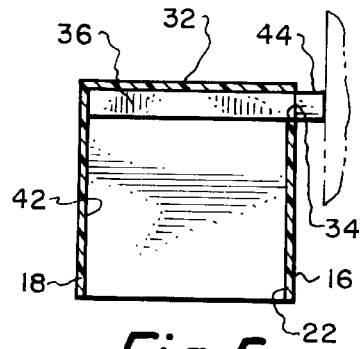
FIG. 5 is a cross-sectional view taken along line 5—5 of FIG. 4.

The outer edge 40 may also include a series of operating buttons 48. Access to these buttons 48 may be obtained directly through the left sidewall 18 since the left sidewall 18 is constructed of a material that is readily flexible therefor by pressing on the sidewall 18 activation of the buttons 48 can be obtained. Note particularly the modified form of attachment 10' shown in FIG. 4 where it may be desirable to include within the sidewall 18 a button access opening 50. This button access opening 50 is to expose the activating buttons 48 so hat the user can select by sight, rather than by feel, which button 48 is to be activated.

The attachment 10 of this invention when disengaged from the monitor 20 can be readily folded or wadded into a collapsed configuration facilitating stowage within one's pocket or purse. In that collapsed configuration, the access opening 22 is of minimal size and is of maximum size when in the expanded or usage configuration shown in the drawing. The sheet material of construction of the attachment 10 will cause the at-rest position of the attachment 10 to be as shown in the drawing. Stretching of the attachment 10 over the video monitor 20 causes the attachment 10 to be mounted in a rigid configuration relative to the video monitor 20. Each of the seams 24, 26, 28 and 30 become rigid. This rigid appearance is desirable during usage of the attachment 10 in conjunction with the video monitor 20 so the attachment 10 will maintain its established shape during usage.

It is considered to be within the scope of this invention that the material of construction of the attachment 10 could also be a leather material as well as a plastic, such as a vinyl. It is also considered to be within the scope of this invention that the attachment 10 could be constructed of a paper material although a paper material would generally not be preferred.

Not only does the use of the attachment 10 help to prevent the glare on the video monitor screen 38, the attachment 10 also functions to prevent sun damage to the video monitor screen 38. Additionally, in some environments where there are a plurality of people present, it may at times be desirable to not display to everybody what images are being recorded or replayed on the video monitor screen 38. Therefore, the use of the attachment 10, by its inherent tubular configuration, provides a tunnel that can be observed only by the user with individuals in near proximity not being able to observe the image on the video monitor screen 38.

The present invention may be embodied in other specific forms without departing from the essential attributes thereof. Reference should be made to the appending claims rather than the foregoing specification as indicating the scope of the invention.

What is claimed is:

1. An attachment for a video monitor frame to reduce glare when observing an LCD screen enclosed by the video monitor frame, provide an element of privacy by limiting observation of the LED screen to only an authorized individual(s) and decrease sun damage to the LED screen, said attachment comprising:

a body having an external sidewall mounted between a back and a front, said back being at least partially closed by a back wall, said front being open forming an access opening into an internal chamber, said internal chamber located interiorly of said body;

said body being locatable in an at-rest position or a collapsed position, said at-rest position locates said access opening at its maximum size and said collapsed position locates said access opening at its minimum size, said body being constructed of a thin sheet material, said sheet material being flexible permitting movement of said body to said collapsed position;

an entry opening formed within said sidewall, whereby when in said at-rest position the video monitor frame is to be inserted through said entry opening to be located within said internal chamber with said sidewall enclosing the video monitor frame preventing the entry of light to the LCD screen except for light that can enter through said access opening; and there being a button access opening formed within said sidewall, whereby said button access opening is to provide access to activating buttons mounted on the video monitor frame.

2. An attachment for a video monitor frame to reduce glare when observing an LCD screen enclosed by the video monitor frame, provide an element of privacy by limiting observation of the LED screen to only an authorized individual(s) and decrease sun damage to the LED screen, said attachment comprising:

a body having an external sidewall mounted between a back and a front, said back being at least partially closed by a back wall, said front being open forming an access opening into an internal chamber, said internal chamber located interiorly of said body;

said body being locatable in an at-rest position or a collapsed position, said at-rest position locates said access opening at its maximum size and said collapsed position locates said access opening at its minimum size, said body being constructed of a thin sheet material, said sheet material being flexible permitting movement of said body to said collapsed position;

an entry opening formed within said sidewall, whereby when in said at-rest position the video monitor frame is to be inserted through said entry opening to be located within said internal chamber with said sidewall enclosing the video monitor frame preventing the entry of light to the LCD screen except for light that can enter through said access opening;

said body being constructed of a rubberized fabric;

said body being stretchable in order to permit mounting of said body onto a video monitor frame which is slightly larger in size than said entry opening; and there being a button access opening formed within said sidewall, whereby said button access opening is to provide access to activating buttons mounted on the video monitor frame.

3. The attachment as defined in claim 2 wherein:

said entry opening being located directly adjacent said back wall.

4. The attachment as defined in claim 3 wherein:

when in said at-rest position, said body being tubular with the configuration of said tube being polygonal.

5. In combination with a video monitor frame to reduce glare when observing of an LCD screen enclosed by said video monitor frame, provide an element of privacy by limiting observation of said LED screen to only an authorized individual(s) and decrease sun damage to said LED screen, said attachment comprising:

a body having an external sidewall mounted between a back and a front, said back being at least partially closed by a back wall, said front being open forming an access opening into an internal chamber, said internal chamber located interiorly of said body;

said body being locatable in an at-rest position or a collapsed position, said at-rest position locates said access opening at a maximum size and said collapsed position locates said access opening at a minimum size, said body being constructed of thin sheet material, said sheet material being flexible permitting movement of said body onto itself to said collapsed position essentially eliminating said internal chamber yet said body remains intact;

an entry opening formed within said sidewall, when in said at-rest position a said video monitor frame is to be inserted through said entry opening to be located within said internal chamber with the sidewall enclosing said video monitor frame preventing the entry of light to said LCD screen except for light that can enter through said access opening; and there being a button access opening formed within said sidewall, whereby said button access opening is to provide access to activating buttons mounted on the video monitor frame.

6. In combination with a video monitor frame to reduce glare when observing of an LCD screen enclosed by said video monitor frame, provide an element of privacy by limiting observation of said LED screen to only an authorized individual(s) and decrease sun damage to said LED screen, said attachment comprising:

a body having an external sidewall mounted between a back and a front, said back being at least partially closed by a back wall, said front being open forming an access opening into an internal chamber, said internal chamber located interiorly of said body;

said body being locatable in an at-rest position or a collapsed position, said at-rest position locates said access opening at a maximum size and said collapsed position locates said access opening at a minimum size, said body being constructed of thin sheet material, said sheet material being flexible permitting movement of said body onto itself to said collapsed position essentially eliminating said internal chamber yet said body remains intact;

an entry opening formed within said sidewall, when in said at-rest position a said video monitor frame is to be inserted through said entry opening to be located within said internal chamber with the sidewall enclosing said video monitor frame preventing the entry of light to said LCD screen except for light that can enter through said access opening; and there being a button access opening formed within said sidewall, whereby said button access opening is to provide access to activating buttons mounted on the video monitor frame.

7. The combination as defined in claim 6 wherein:

said entry opening being located directly adjacent said back wall.

8. The combination as defined in claim 7 wherein:

when in said at-rest position, said body being tubular, said body transverse cross-section being polygonal.

* * * * *